United States Patent
Tanaka

[11] Patent Number: 5,858,502
[45] Date of Patent: Jan. 12, 1999

[54] WEATHER STRIP MOLDING

[75] Inventor: Yuji Tanaka, Aichi, Japan

[73] Assignee: Tokai Kogyo Kabushiki Kaisha, Oobu, Japan

[21] Appl. No.: 718,153

[22] Filed: Sep. 18, 1996

[30] Foreign Application Priority Data

Sep. 19, 1995 [JP] Japan .................................. 7-266300

[51] Int. Cl.$^6$ .................................................. B32B 5/14
[52] U.S. Cl. ........................ 428/119; 428/217; 428/122; 428/515; 49/490.1
[58] Field of Search ................................ 428/122, 119, 428/217, 515; 49/490.1, 475.1

[56] References Cited

FOREIGN PATENT DOCUMENTS 1136816  5/1989  Japan ..................................... 49/490.1
4-320838  11/1992  Japan .

*Primary Examiner*—Alexander Thomas
*Attorney, Agent, or Firm*—Oblon, Spivak, McClelland, Maier & Neustadt, P.C.

[57] ABSTRACT

A weatherstrip molding exhibiting an excellent fitting capability with a corner section of a windshield frame of a vehicle. Even when the weatherstrip molding has been folded for a certain period of storage or packing, no cease mark or wrinkle is left on a slide contact section thereof. The weatherstrip molding includes a main body section fit with a windshield frame of a vehicle and a slide contact section slidably contacted with a windshield moving up and down, both of which are integrally molded. The main body section is formed of an olefin thermoplastic elastomer containing olefin resin and rubber. The slide contact section is formed of a mixture containing a polyolefin resin and a thermoplastic elastomer such as a styrene thermoplastic elastomer.

7 Claims, 5 Drawing Sheets

WEATHER STRIP MOLDING

BACKGROUND OF THE PRESENT INVENTION

1 Field of the Invention

The present invention relates to a weatherstrip molding for a vehicle such as a glass run channel, belt molding or the like.

2 Description of the Related Arts

Conventionally a windshield 80 of an automobile 8 shown in FIG. 5 has a glass run channel 9 fit with an inner periphery of a windshield frame 82 so that a gap between the windshield frame 82 and a windshield glass 81 is sealed as shown in FIG. 6. A belt molding 850 is fit with an inner periphery of a lower windshield frame 85, which contacts with the windshield glass 81.

The glass run channel 9 and the belt molding 850 are generally termed as a weatherstrip molding.

Referring to FIG. 6, the glass run channel 9 is formed of a main body 91 having a U-shaped cross section fit with the windshield frame 82 of the automobile 8 and a glass lip 92 having a slide contact section slide contacted with the windshield glass 81 moving up and down for closing and opening, both of which are integral molded.

A publication of JPA-No. 320838/1992 discloses the application of a thermoplastic elastomer laminated structure for forming the above-described glass run channel 9. The thermoplastic elastomer laminated structure consists of a thermoplastic elastomer layer comprising a crystalline polyolefin and a rubber and an ultra-high-molecular polyolefin layer.

The glass run channel 9 of the above-described prior art is formed by using the thermoplastic elastomer consisting of a crystalline polyolefin and a rubber as the main body 91 and using the ultra-high-molecular polyolefin as the surface of the glass lip 92.

The above-formed glass run channel 9 using the elastomer laminated structure, however, has several disadvantageous points as described below.

As the glass run channel 9 is formed into a long elastomeric member as shown in FIG. 7(A), it is often the case that such member is folded so as to be easily handled for a certain period of storage or packing as shown in FIG. 7(B) prior to being fit with the windshield frame 82.

When using the glass run channel 9 for fitting, it is spread out again. At this time, however, a crease mark 98 is likely to be left on the glass lip 92 formed on a surface of the slide contact section as FIG. 7(C) shows. Similarly a wrinkle 99 may be left on the glass lip 92 as shown in FIG. 7(C) because of insufficient restoring force of the glass run channel 9 stretching the folded section.

As shown in FIG. 5, the windshield frame 82 has loosely curved corners 89. Fitting the glass run channel 9 with such corner 89 is likely to cause a gap therebetween owing to poor fitting. Additionally the glass run channel 9 gets unnecessarily tensed up, causing a tight stretch therein.

SUMMARY OF THE INVENTION

It is an object of the present invention to provide a weatherstrip molding for a vehicle which can be well fit with corner sections of a windshield frame without causing any creasing mark nor wrinkling on the slide contact section thereof during a certain period of storage and packing.

The present invention is realized by providing a weatherstrip molding for a vehicle comprising a main body section fit with a windshield frame of a vehicle and a slide contact section slide contacted with a windshield moving up and down, both of which are integral molded. The main body section is formed of an olefin thermoplastic elastomer containing olefin resin and rubber and the slide contact section is formed of a mixture containing a polyolefin resin and a thermoplastic elastomer.

This and other objects, features and advantages of the present invention will become more apparent upon a reading of the following detailed description and drawings.

DESCRIPTION OF THE PREFERRED EMBODIMENT

Figure 1:
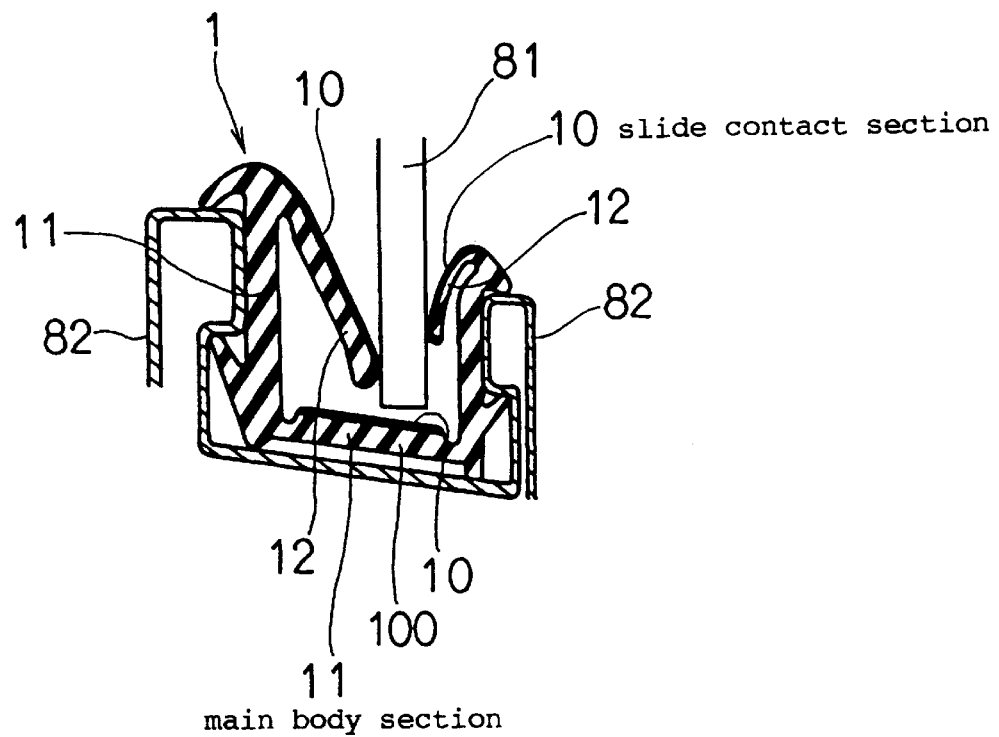
FIG. 1 is a cross sectional view of a weatherstrip molding for a vehicle of a first example of this invention.

A weatherstrip molding of the present invention for a vehicle has a slide contact section formed from the above-described materials exhibiting a high restoring ratio as well as appropriate hardness. Even when the weatherstrip molding has been folded up for a certain period of storage or packing, no crease mark nor wrinkle is left on the folded slide contact section.

As the weatherstrip molding of this invention exhibits an excellent fitting capability, it can be well-fit with each corner section of the windshield frame without causing slack nor excessive stretch.

The main body section is formed from a thermoplastic elastomer consisting of the olefin resin and rubber. As the olefin resin, polypropylene or the like can be used. As the rubber, EPDM or the like can be used.

The slide contact section is, on the other hand, formed from a mixture of the polyolefin resin and the thermoplastic elastomer. As the polyolefin resin, polyethylene, polypropylene or the like can be used.

It is preferable that the thermoplastic elastomer used for producing the mixture is formed from a styrene thermoplastic elastomer or a mixture elastomer obtained from combining the styrene thermoplastic elastomer and the olefin thermoplastic elastomer.

Using the styrene thermoplastic elastomer decreases the dynamic frictional resistance of the slide contact section 10. As a result the slide contact between the slide contact section and the windshield glass is smoothed, thus providing a flaw-free effect. Using the mixture elastomer provides the improved weather resistance.

As the styrene thermoplastic elastomer, "CLAYTON"™ produced by Shell Chemical; "LAVARON"™ produced by Mitsubishi Petrochemical Co., Ltd. or the like can be used.

The "CLAYTON" derived from saturating the double bond through hydrogenation exhibits excellent weather resistance.

As the olefin thermoplastic elastomer, "Milastomer"™ produced by Mitsui Petrochemical Industries, Ltd., "Santoprene"™ produced by AES or the like can be used.

As the mixture elastomer containing the styrene thermoplastic elastomer and the olefin thermoplastic elastomer, the material derived from blending a polyolefin and a styrene thermoplastic elastomer (hydrogenated) can be used.

The mixture elastomer of the above composition keeps its elasticity even at a high temperature as well as exhibiting excellent oil resistance.

The composition of the styrene thermoplastic elastomer combined with the polyolefin resin as the material for forming the slide contact section 10 is, for example, 30 to 40 wt. % of the styrene thermoplastic elastomer, 10 to 20 wt. % of olefin, 20 to 50 wt. % of oil and 10 to 30 wt. % of other additives.

It is preferable to add 10 wt. % or more thermoplastic elastomer as described above to 100 wt. % of the polyolefin resin for forming the mixture used as the slide contact section.

In case the added amount is smaller than 10 wt. %, the resultant slide contact section may cause a creasing mark or wrinkling resulted from being folded for storage or packing.

It is further preferable to add 20 to 50 wt. % of the above thermoplastic elastomer to 100 wt. % of the polyolefin resin.

In case the added mixture amount is larger than 50 wt. %, the frictional resistance of the resultant slide contact section is increased, deteriorating the slide contact to the windshield glass. Similarly the rigidity of the contact section is decreased, resulting in degraded durability.

The slide contact section can be formed on the surface of the glass lip extensively provided along with the inner direction of the main body section (FIG. 1). The slide contact section can be formed on a section slide contacted with the windshield glass locating in a position other than the glass lip.

It is preferable that the slide contact section has a restoring ratio equal to or higher than 25%. In case the restoring ratio is less than 25%, the crease mark or wrinkle may be left to some extent. The fitting capability of the slide contact section to the corner section of the windshield frame is slightly deteriorated.

It is more preferable that the restoring ratio is even 30% or more. The restoring ratio stands for a value indicating the force of a substance under the stress to restore to its original status by removing the stress exerted thereto.

It is preferable that the slide contact section has a hardness (D) equal to or higher than 50. If the hardness is less than 50, the resultant frictional resistance is degraded.

The weatherstrip molding of the present invention for a vehicle is applicable to those parts slide contacting with the windshield glass such as the glass run channel, belt molding or the like.

DESCRIPTION OF THE PREFERRED EXAMPLE

Example 1

A weatherstrip molding for a vehicle of this example according to the present invention is hereinafter described referring to FIG. 1.

Figure 5:
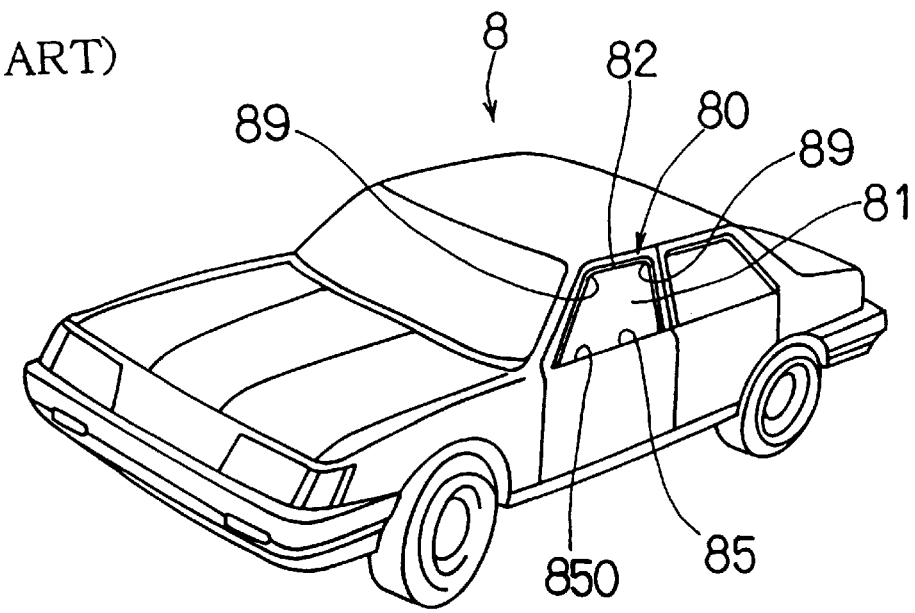
FIG. 5 is an explanatory perspective view showing the front section of an automobile featuring a conventional weatherstrip molding.
Figure 6:
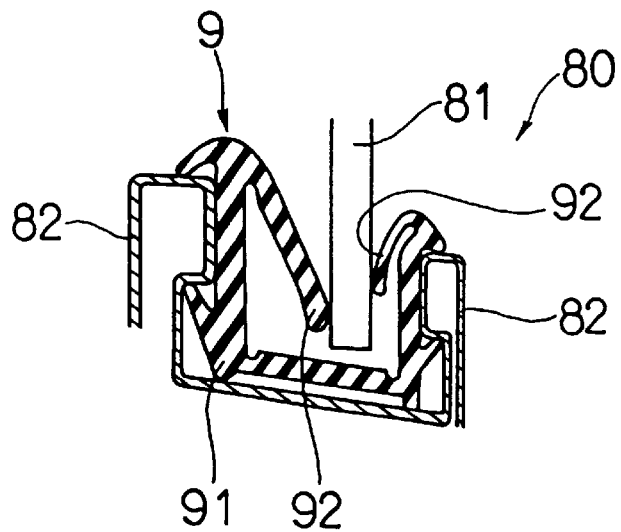
FIG. 6 is a cross sectional view of the conventional weatherstrip molding for a vehicle.

A weatherstrip molding 1 for a vehicle of this example in FIG. 1 is formed as a glass run channel which is fit with a windshield frame 82 of an automobile 8 as shown in FIG. 5. The glass run channel comprises a main body section 11 having a U-shaped cross section and a slide contact section 10 slidingly contacted with a windshield glass 81 moving up and down for closing and opening, both of which are integral molded.

A glass lip 12 is inwardly provided at each end of the U-shaped main body section 11. The slide contact section 10 is provided on a surface of the glass lip 12.

The slide contact section 10 is also provided on an inner surface of a bottom 100 of the U-shaped main body section 11.

The weatherstrip molding 1 is produced by extrusion molding a base part consisting of the main body section 11 and the glass lip 12 through an extruder. Then the material for forming the slide contact section 10 is extruded to each surface of the glass lip 12 and the inner surface of the bottom 100 of the main body section 11 for integral molding.

The main body section 11 is formed of an olefin thermoplastic elastomer produced from an olefin resin and a rubber. The slide contact section 10 is formed of a mixture of a polyolefin resin and a thermoplastic elastomer. "Milastomer"™ (produced by Mitsui Petrochemical Industries, Ltd., Product No.: G650B) was used as the olefin thermoplastic elastomer for forming the main body section 11.

"Lubmer"™ (produced by Mitsui Petrochemical Industries, Ltd., product No. TM81B), was used as the polyolefin of the mixture forming the slide contact section 10. "Actimer"™ (produced by Riken Vinyl Industry Co. Ltd., product No. 1060S) was used as the styrene thermoplastic elastomer of the mixture forming the slide contact section 10. Each pellet of the polyolefin resin and the thermoplastic elastomer was dry blended to form the slide contact section 10.

Figure 7A:
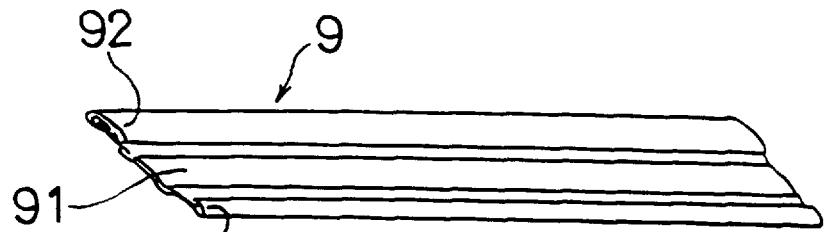
FIG. 7 (A)–(C) is an explanatory perspective view indicating a creasing mark and wrinkling left on the conventional weatherstrip molding resulted from being folded.
Figure 7B:
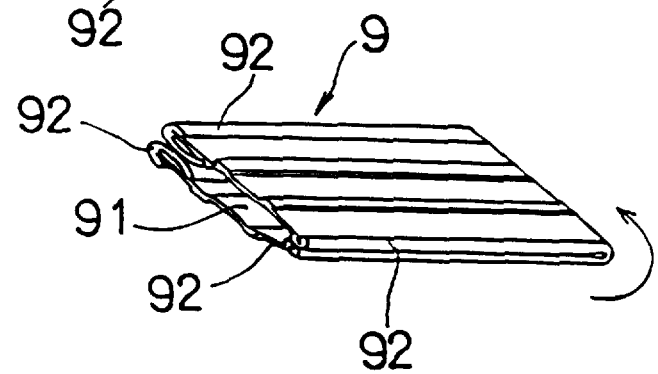
Figure 7C:
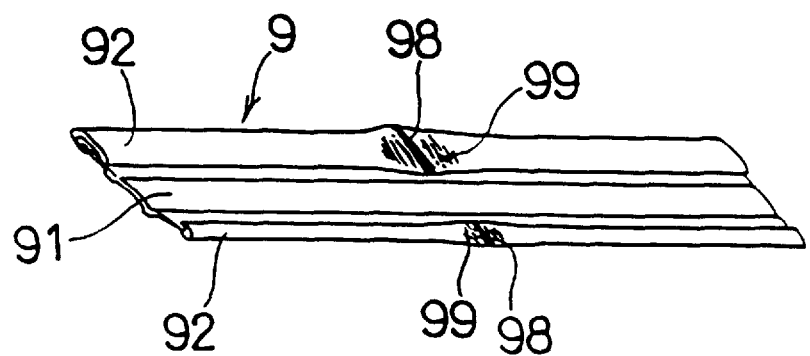

The weatherstrip molding 1 of this example formed of the above-described materials exhibits a high restoring ratio and appropriate hardness. Even when the weatherstrip molding 1 has been folded up for a certain period of storage or packing, no creasing mark nor wrinkle is left on the folded section (see FIG. 7).

The weatherstrip molding 1 can be well-fit with each corner 89 of the windshield frame 82 as shown in FIG. 5 leaving no excessive slack nor tightness.

Example 2

Figure 2:
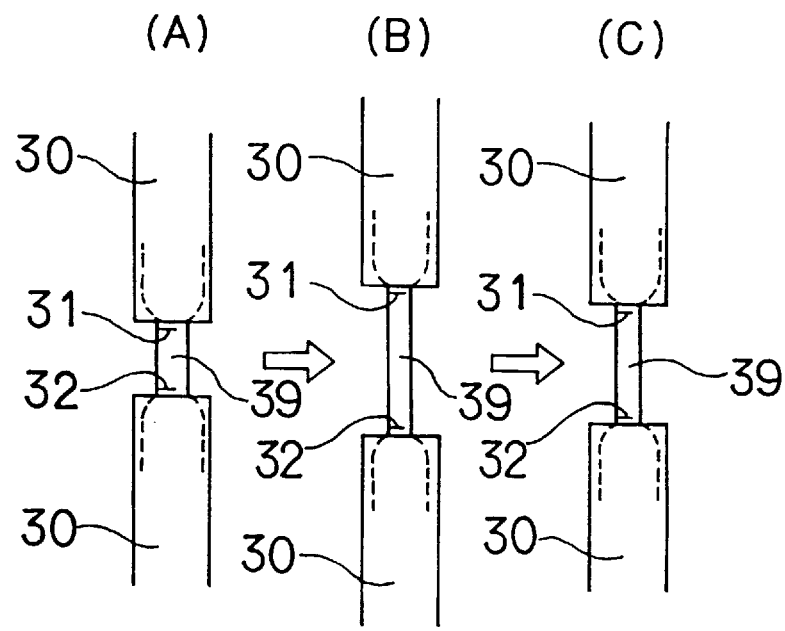
FIG. 2 is an explanatory view representing a tensile testing conducted in a second example of this invention.
Figure 3:
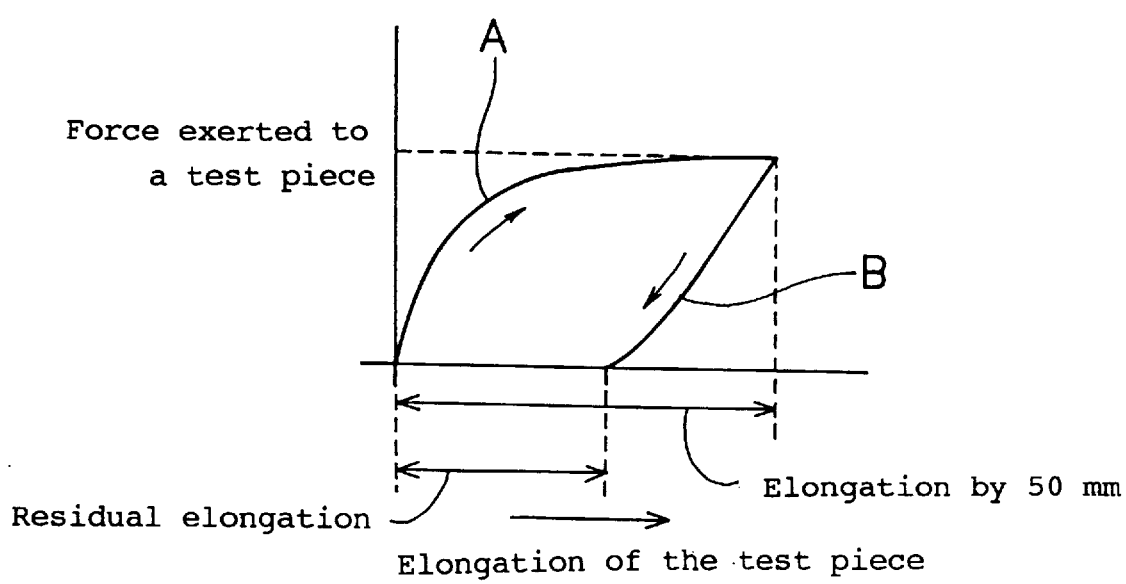
FIG. 3 is a graphical representation of an autograph of the second example of this invention.
Figure 4:
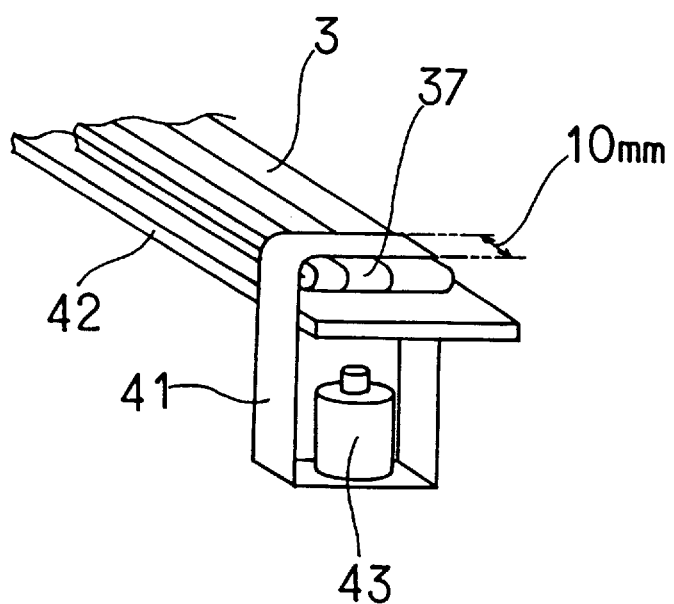
FIG. 4 is an explanatory view representing a folding testing conducted in the second example of this invention.

The performance of the weatherstrip molding 1 of the present invention for a vehicle is described referring to FIGS. 2 to 4 and Tables 1 and 2.

First 6 kinds of weatherstrip moldings similar to the one described in the Example 1 were prepared as samples 1 to 6. As Table 1 shows, each of those samples 1 to 6 has a different mixture ratio of the thermoplastic elastomer to 100 wt. % of polyethylene resin (polyolefin resin).

Measurement of each restoring ratio of the respective samples 1 to 6 is described referring to FIGS. 2 and 3.

Each test piece 39 was prepared from the samples 1 to 6 as FIGS. 2(A) shows. Two reference lines 31 and 32 were marked in the center of the test piece 39 so that the distance therebetween was set to 50 mm.

Then both ends of the test piece 39 were secured by a tensile testing machine 30. As FIG. 2(B) shows, the test piece 39 was pulled from both sides at a tensile speed of 50 mm/minute.

An autograph curve A of FIG. 3 represents a relationship between the force exerted to the test piece 39 and the resultant stretch thereof.

The tensile testing to the test piece 39 was continued until the distance between reference lines 31 and 32 became 100 mm, i.e., the stretch of the test piece 39 reached 50 mm. Both ends of the test piece 39 were released and left until it restored its original status with its own reaction force.

An autograph curve B of FIG. 3 represents a relationship between the force exerted to the test piece 39 and the stretch thereof after the tensile testing.

When it was determined that the test piece 39 no longer restored, the distance between the reference lines 31 and 32 was measured. The value obtained by subtracting 50 mm (original distance) from the measured distance was set as a "residual elongation". A restoring ratio was obtained based on the residual elongation using the following equation.

Restoring ratio=(residual elongation/50 mm)×100%

Each hardness (D hardness) of the samples 1 to 6 was measured through JIS-K-6301 (a momentary value was measured by ASTM-D-durometer).

Each slide contact resistance of those samples 1 to 6 was measured in the following manner. The samples 1 to 6 were fit with the windshield frame 82 as shown in FIG. 1 so as to contact the windshield glass 81 with the slide contact section 10. When the glass windshield 81 was vertically driven by 100 mm, the exerted loads were measured. Then the average load was obtained.

Each dynamic friction coefficient of those samples 1 to 6 was measured under a vertical load of 1 kg at a friction speed of 100 mn/min.

Each of samples 1 to 6 was subjected to a folding test. As FIG. 4 shows, each weatherstrip molding 3 formed from the respective samples 1 to 6 was folded and placed on a table 42. Then a frame plate 41 (width: 10 mm) was set over a folded section 37 of each of those samples. A weight 43 (500 g) was placed on a bottom of the frame plate 41. Those samples were kept in the above condition for one minute.

Then the weight 43 was removed and the folded section 37 of the weatherstrip molding 3 was spread out to check for any creasing mark or wrinkling.

In Table 1, "○" is marked when no creasing mark or wrinkling was left and "X" is marked when the creasing mark or wrinkling was left.

As Table 1 shows, no wrinkle or the like was left on each folded section of those samples 2 to 6 in the folding test. While the wrinkling was left on the sample 1 in the folding test. Samples 2 to 6 showed excellent characteristics in view of fitting with the corner section. The sample 1 showed an inferior characteristic to those of the samples 2 to 6.

Table 2 shows each physical property required to the weatherstrip molding for a vehicle. Tables 1 and 2 indicate that those samples 2 to 6 of the present invention satisfy the condition shown in Table. 2.

The present invention provides the weatherstrip molding exhibiting excellent fitting capability with the corner section. Even when the weatherstrip molding has been folded up for a certain period of storage or packing, no crease mark or wrinkle is left on its slide contact member.

(TABLE 1)

| | samples | | | | | |
|---|---|---|---|---|---|---|
| | 1 | 2 | 3 | 4 | 5 | 6 |
| thermoplastic elastomer/polyethylene resin | 0/100 | 10/100 | 20/100 | 30/100 | 50/100 | 100/100 |
| restoring ratio (%) | 17 | 29 | 34 | 36 | 37 | 51 |
| hardness (D hardness) | 66 | 65 | 60 | 57 | 54 | 47 |
| slide contact resistance (N) | 0.9 | 0.9 | 1.8 | 1.8 | 2.0 | 2.0 |
| dynamic friction coefficient | 0.17 | 0.17 | 0.19 | 0.21 | 0.23 | 0.28 |
| folding test | x | ○ | ○ | ○ | ○ | ○ |

(TABLE 2)

| | criteria |
|---|---|
| slide contact resistance (N) | 6.0 or less |
| dynamic friction coefficient | 0.5 or less |
| wear resistance | no exposure of the base material |

What is claimed is:

1. A weatherstrip molding for a vehicle, comprising a main body section engageable with a windshield frame of a vehicle and a slide contact section slidably engageable with a windshield which is movable up and down, wherein each of said main body section and said slide contact section are integrally molded, said main body section comprises an olefin thermoplastic elastomer containing an olefin resin and rubber and said slide contact section comprises a mixture containing a polyolefin resin and a thermoplastic elastomer and wherein said thermoplastic elastomer used in said mixture comprises at least one of a styrene thermoplastic elastomer or a mixture elastomer containing said styrene thermoplastic elastomer and an olefin thermoplastic elastomer.

2. The weatherstrip molding of claim 1, wherein said mixture is formed by adding 10 wt. % or more said thermoplastic elastomer to 100 wt. % of said polyolefin resin.

3. The weatherstrip molding of claim 1, wherein said mixture is formed by adding 20 to 50 wt. % of said thermoplastic elastomer to 100 wt % of said polyolefin resin.

4. The weatherstrip molding of claim 1, wherein said slide contact section is formed on a surface of a lip which is provided on a portion of said main body section which is engageable with the window.

5. The weatherstrip molding of claim 4, wherein said slide contact section has a D hardness of at least 50.

6. The weatherstrip molding of claim 1, wherein said slide contact section has a restoring ratio of at least 25%.

7. The weatherstrip molding of claim 6, wherein said restoring ratio is at least 30 wt %.

* * * * *